INVENTOR
WILLIAM D. LAWRIE

INVENTOR
WILLIAM D. LAWRIE

BY Holcombe, Wetherill & Brisebois
ATTORNEYS 3,473,850
Patented Oct. 21, 1969

3,473,850
BRAKE CONTROL SYSTEMS
William David Lawrie, Tyseley, Birmingham, England, assignor to Girling Limited
Filed Mar. 4, 1966, Ser. No. 531,996
Claims priority, application Great Britain, Mar. 5, 1965, 9,472/65
Int. Cl. B60t 8/02, 11/20, 8/12
U.S. Cl. 303—21                 3 Claims

ABSTRACT OF THE DISCLOSURE

A vehicle braking system comprising at least one wheel brake, a source of fluid under pressure, control means to which a first force can be applied by means of a drivers control in a sense to increase the supply of fluid to the wheel brake, transducer means arranged to sense deceleration of a braked wheel and to generate an electrical signal in proportion to the said deceleration, and means responsive to the said signal to apply to the control means a second force opposing the said first force and proportional to the said deceleration, said control means being connected to regulate the supply of fluid to the wheel brake during braking in dependence on the proportional relationship between said first and second forces.

---

The present invention has for its object the provision of a vehicle braking system which is adapted to reduce the braking force applied to one or more wheels in such a manner that the danger of wheel locking is eliminated or substantially reduced.

The invention accordingly provides a vehicle braking system comprising at least one wheel brake, a source of fluid under pressure, control means to which a first force can be applied by means of a drivers control in a sense to increase the supply of fluid to the wheel brake, transducer means arranged to sense deceleration of a braked wheel and to generate an electrical signal in proportion to the said deceleration, and means responsive to the said signal to apply to the control means a second force opposing the said first force and proportional to the said deceleration, the arrangement being such that during braking the control means is in equilibrium under the first and second forces to control the supply of fluid to the wheel brake to maintain the wheel brake applied.

Figure 1:
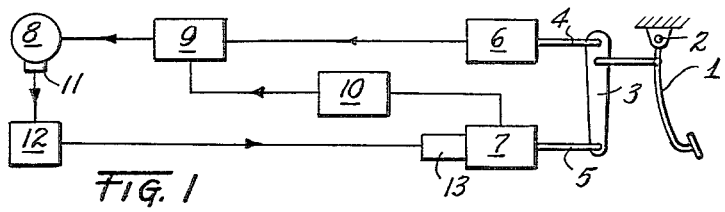
Figure 3:
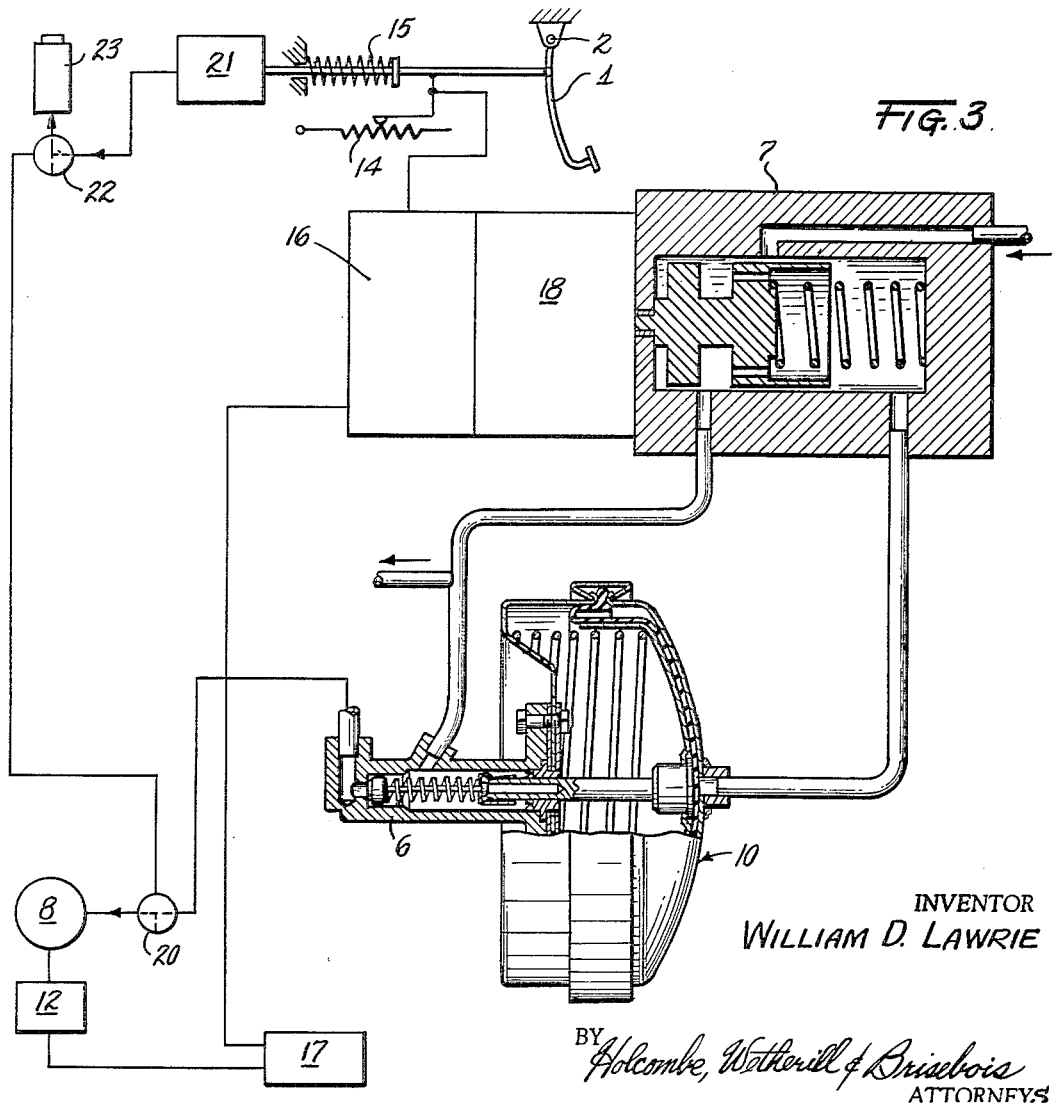
Figure 4:
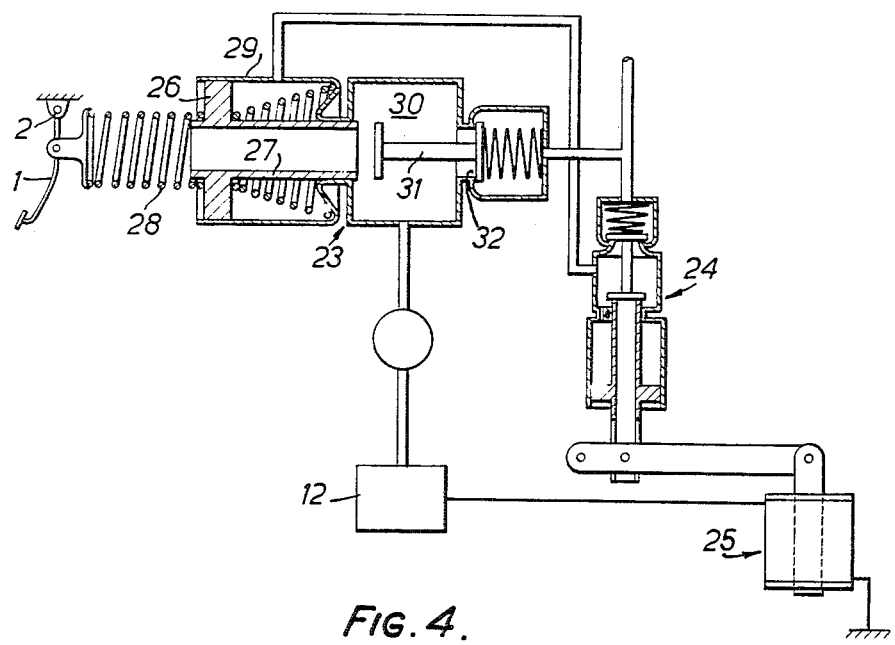
Figure 5:
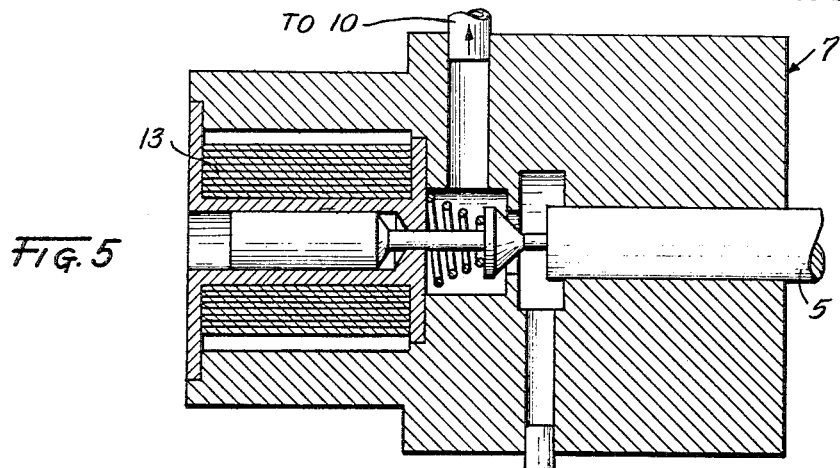
Figure 6:
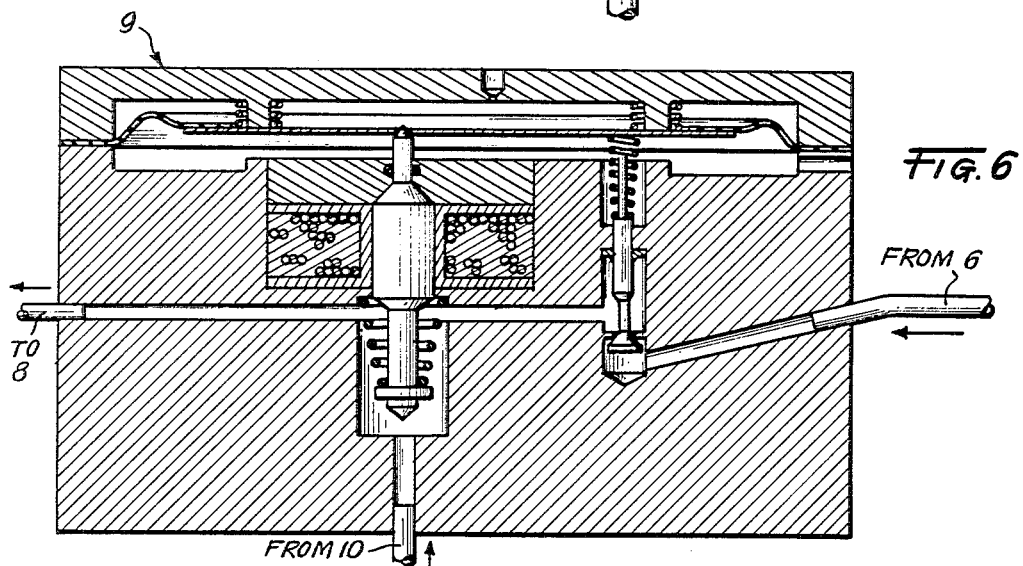
Figure 7:
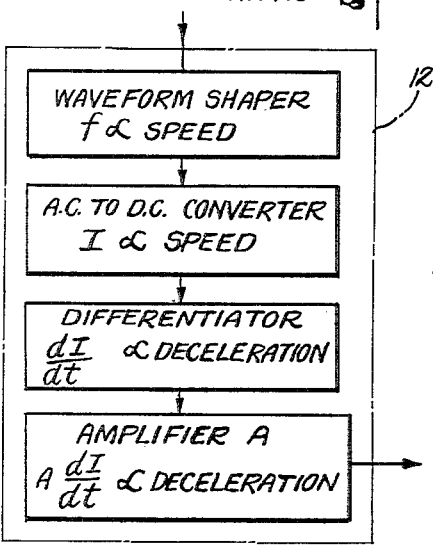

Further features and advantages of the invention will appear from the following description, given by way of example only, of some braking systems in accordance therewith, reference being made to the accompanying diagrammatic drawings, in which FIGURES 1 to 4 show four different systems and FIGURES 5, 6 and 7 show the air valve 7, safety valve 9, and deceleration sensing circuit 12 respectively of FIGURE 1 in greater detail.

In FIGURE 1 the system shown is hydraulic and comprises an operator's control element in the form of a pedal 1 pivoted at 2 and coupled to a lever 3 itself coupled by rods 4 and 5 to the push rod of a master cylinder 6 and an air valve 7. This valve is shown in detail in FIGURE 5. The master cylinder output path to a slave cylinder at a wheel 8 is controlled by a safety valve 9 which also controls the output path to that slave cylinder from a vacuum operated actuator 10. This valve is shown in detail in FIGURE 6. The fluid pressure output of the actuator 10 is determined in known manner by the air valve 7. A transducer device 11 provides an electric signal proportional to wheel speed, this signal being fed to a deceleration sensing circuit 12 which applies through electromagnetic means in the form of a solenoid 13, a second force proportional to wheel deceleration to the air valve 7 (which constitutes a control means) in opposition to the first force applied by the lever 3. This circuit is shown in greater detail in FIGURE 7.

In normal operation, when the pedal 1 is depressed, the rod 5 acts as the fulcrum for the lever 3, which then pushes directly on the master cylinder push rod to generate fluid pressure for application of the wheel brakes. If the wheels are rolling above a certain speed, if the electric power supply is working, and if the vacuum supply is available, the safety valve will seal off the master cylinder output path. The rod 4 then acts as the fulcrum for the lever 3 which opens air valve 7 to let air into the actuator 10. The actuator hydraulic output thus generated is then fed to the brake slave cylinder through the safety valve 9, and a signal proportional to deceleration from the device 12 produces at the solenoid 13 a force opposing the force applied by the driver to the lever 3, so that the driver is prevented from applying a braking force sufficient to lock the wheels suddenly.

If the wheels slow below a predetermined speed, or the supply voltage or the vacuum fall below predetermined levels, the safety valve 9 isolates the actuator hydraulic output and opens the master cylinder output path. The lever 3 then pivots about the rod 5 as a fulcrum and operates the master cylinder 6 by a lever ratio near unity. If the master cylinder is chosen carefully, the brake system thus operates as a simple direct acting, hydraulic system when either of the power sources fail or if the wheels slow below a certain speed, or any combination of these eventualities arises.

A switch (not shown) is incorporated in the system so that the system is only energised when the pedal 1 is depressed, since otherwise the system will try to prevent acceleration or deceleration even without the driver touching the pedal.

A further device may be incorporated to modify the response of the control system when the vehicle is on a hill, so as to compensate for the inherent acceleration or deceleration when the vehicle is travelling downhill or uphill. Thus the device would allow the vehicle to "freewheel" downhill any pedal load merely reducing the acceleration due to the hill, or it would allow further deceleration in addition to the deceleration produced on "freewheeling" uphill.

The system would produce wheel deceleration proportional to the pedal load when fade occurred until something failed, so a device which measure fade or brake temperature could be incorporated to supplement the current supplied to solenoid 13 in proportion to fade or brake temperature.

The system assists in avoiding skid, because even on ice the wheel angular deceleration would never exceed the value demanded at the pedal. Violent wheel locking would then be avoided and the wheels will continue to rotate for some time after the brakes are applied.

Figure 2:
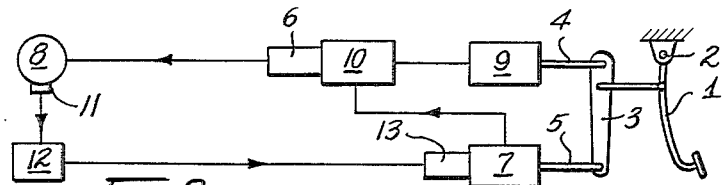

In the arrangement of FIGURE 2, the rod 4 is arranged for direct mechanical coupling to the push-rod of the master cylinder 6 by a mechanical safety device 9. The actuator 10 is coupled directly to the master cylinder push-rod, and is controlled by the air valve 7 as before.

In normal operation when the pedal 1 is depressed, the safety device 9 provides a positive stop to the rod 4, and the lower end of the lever 3, pushing on air valve 6, lets air into the actuator 10, thus applying the brakes. As before the deceleration sensing circuit 12 opposes through the solenoid 13 the force applied by the lever 3 to the air valve 7. The resulting deceleration is thus proportional to the load on the pedal 1.

If the wheel velocity, vacuum or supply voltage fall below predetermined levels, the safety device 9 couples the rod 4 to the master cylinder push-rod. Lever 3 then pivots about the end of the rod 5 so that the pedal 1 is connected to the master cylinder 6.

In the arrangement of FIGURE 3, an electrical signal representing the position of the brake pedal is combined with the deceleration signal from device 12 in a control circuit and used to control the braking force applied by the actuator 10. Provision is made for by-passing the actuator and control system.

With the system arranged as shown for power actuated operation, the brake pedal 1 works the slider of a variable resistance 14 against the bias of a spring 15 to vary the current flowing in the control circuit 16 so as to provide a signal proportional to displacement of the brake pedal. The control circuit 16 is also supplied with the deceleration signal from the deceleration sensing device 12 through a current amplifier 17. The control circuit 16 controls the current flowing in a solenoid 18 which is coupled to the valve member of a shuttle valve 7, controlling the supply of air to actuator 10 which is coupled directly to the master cylinder 6. A tap 20 is provided in the output path from the master cylinder 6 to connect the slave cylinder to a pedal operated master cylinder 21 for pedal operation of the brakes. A further tap 22 is provided in the output path from the master cylinder 21 to divert the output from the master cylinder 21 to a reservoir tank 23 during power operation of the brakes.

When the pedal 1 is depressed the current from the resistance 14 passing through the control circuit 16 operates the solenoid 18 and the air valve 7 causing air to be admitted to the actuator 10. As the brakes are applied the vehicle begins to decelerate and current from the sensing device 12 opposes the current from the resistance 14. The air valve maintains the pressure in the actuator 10 proportional to the current through the solenoid. Thus, in this embodiment, the counteracting forces on the solenoid 18 are a first force produced by the current from resistance 14 and a second force from the sensing device 12, and the solenoid 18 and valve 7 constitutes a control means.

FIGURE 4 shows a pneumatic brake operating system. The brake pedal 1 controls a main control valve 23 (constituting the control means) which in turn controls the pressure of the air supplied to the brakes. The deceleration sensitive device 12, which in this case is driven mechanically from the wheel 8 controls a further control valve 24 through a solenoid 25, the valve 24 being arranged to feed back an air pressure (or second force) to the valve 23 proportional to the deceleration of the wheel 8, such fed back air pressure acting in opposition to the load (first force) applied by the brake pedal.

The main control valve 23 comprises an annular piston 26 bearing an inlet tube 27, and is connected to the brake pedal 1 by a spring 28. The piston 26 slides in a cylinder 29. The tube 27 extends into a valve chamber 30 to co-operate with one end of a double-ended shuttle 31 the other end of which co-operates with a further port 32. With the brake pedal 1 in its rest position as shown, the tube 27 clears the shuttle 31 and atmospheric pressure is supplied to the brake. On depressing the brake pedal 1 the tube 27 is urged forward and engages and is closed off by the shuttle 31, lifting the shuttle off its seat 32 and hence supplying high pressure air to the brakes. The resulting deceleration actuates the solenoid 25 which operates the feedback valve 24, which is a shuttle valve similar in construction to the valve 23 having its two chambers in communication. The fed back pressure in the cylinder 29 acts on the piston 26 in opposition to the force of the spring 28 loaded by the driver so that in equilibrium the force applied by the driver to compress the spring 28 is balanced by the deceleration pressure in the chamber 29 and the pressure of the air in the chamber 30 acting on the shuttle 31. Any deviation of the wheel deceleration from that required by the driver causes the piston 26 to be actuated by the fluid pressure in the chamber 29 to adjust the braking effort accordingly.

In this embodiment the deceleration sensitive device is arranged to sweep a potentiometer winding in proportion to the deceleration of the wheel. The potentiometer is arranged to provide an output current in proportion to the wheel deceleration, and this current is used directly, or indirectly, through a current amplifier, to operate the solenoid 25. The "gain" of the feedback loop and hence the pedal travel, may be adjusted if a lever system, as shown, is interposed between the solenoid 25 and the feedback valve 24.

In each of the embodiments described, any convenient form of transducer may be employed to drive an electrical signal proportional to deceleration. The transducer may, for example, include a D.C. generator or a simple alternator.

What I claim is:

1. A vehicle braking system comprising at least one wheel brake, a source of fluid under pressure, control means including a control valve through which a first force can be applied by means of a drivers control in a sense to increase the supply of fluid to the wheel brake, transducer means arranged to sense deceleration of a braked wheel and to generate an electrical signal in proportion to the said deceleration, and electro-magnetic means responsive to the said signal to apply to the control means a second force opposing the said first force and proportional to the said deceleration, said control means being connected to regulate the supply of fluid to the wheel brake during braking in dependence on the proportional relationship between said first and second forces, said system further comprising power-assisted fluid pressure generating means under the control of said control valve, direct fluid pressure generating means under the direct control of the driver, and a unitary input member coupled to the two fluid pressure generating means in such a manner that failure of the input member to operate the power-assisted means will cause the effort of the input member to be applied to the direct fluid pressure generating means.

2. A vehicle braking system in accordance with claim 1, in which said input member is under the control of a driver, and comprising electrical signal generating means operable by said input member to generate a signal in accordance with displacement of said input member, said electro-magnetic means being responsive to the last said signal means for operating said control valve in a sense to increase the supply of fluid pressure to each said wheel brake.

3. A vehicle braking system comprising at least one wheel brake, a supply of gaseous fluid under pressure, a main control valve normally closed to prevent the supply of pressure fluid to the wheel brake, an input member under the control of a driver for opening the said control valve, fluid pressure actuated means operable to oppose actuation of the input member, a second control valve which is normally closed to isolate said fluid pressure actuated means from said supply, transducer means arranged to sense deceleration of a braked wheel and to generate an electrical signal in proportion to the said deceleration, and electro-magnetic means operable in response to generation of an electrical signal by the said transducer means to open the second control valve, thereby admitting fluid under pressure to the said pressure actuated means.

References Cited

UNITED STATES PATENTS

| | | | |
|---|---|---|---|
| 2,868,338 | 1/1959 | Lucien et al. | 188—181 |
| 3,034,836 | 5/1962 | Ruof | 303—21 |
| 3,089,734 | 5/1963 | Jankus | 303—21 |
| 3,235,036 | 2/1966 | Meyer et al. | 303—21 |

DUANE A. REGER, Primary Examiner

U.S. Cl. X.R.

188—181; 303—14